(12) United States Patent
Schneider

(10) Patent No.: US 9,910,688 B2
(45) Date of Patent: Mar. 6, 2018

(54) IMPLEMENTING ASPECTS WITH CALLBACKS IN VIRTUAL MACHINES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1656 days.

(21) Appl. No.: 12/325,086

(22) Filed: Nov. 28, 2008

(65) Prior Publication Data

US 2010/0138815 A1    Jun. 3, 2010

(51) Int. Cl.
*G06F 9/45*        (2006.01)
*G06F 9/455*       (2018.01)
*G06F 9/445*       (2018.01)

(52) U.S. Cl.
CPC ............ *G06F 9/45504* (2013.01); *G06F 8/41* (2013.01); *G06F 9/44521* (2013.01)

(58) Field of Classification Search
CPC ..... G06F 9/45504; G06F 9/44521; G06F 8/41
See application file for complete search history.

(56) References Cited

U.S. PATENT DOCUMENTS

| | | | | |
|---|---|---|---|---|
| 6,467,086 B1 * | 10/2002 | Kiczales et al. | ............... | 717/165 |
| 6,473,895 B1 * | 10/2002 | Lopes | ................. | G06F 8/316 |
| | | | | 717/114 |
| 6,539,390 B1 * | 3/2003 | Kiczales | ................. | G06F 8/316 |
| 7,140,007 B2 * | 11/2006 | Lamping | ................. | 717/154 |
| 7,350,211 B2 * | 3/2008 | Bjare et al. | ................. | 719/311 |
| 7,624,383 B2 * | 11/2009 | Barr et al. | ................. | 717/135 |
| 7,665,076 B2 * | 2/2010 | Clement | ................. | G06F 8/443 |
| | | | | 717/148 |
| 7,707,566 B2 * | 4/2010 | Grover et al. | ................. | 717/148 |
| 7,849,273 B2 * | 12/2010 | Passerini et al. | ............. | 711/154 |
| 7,849,451 B2 * | 12/2010 | Palacz et al. | ................. | 717/148 |
| 7,945,591 B2 * | 5/2011 | Kumar et al. | ................ | 707/796 |
| 2001/0037495 A1 * | 11/2001 | Kato | ................... | G06F 9/45504 |
| | | | | 717/141 |
| 2002/0066087 A1 * | 5/2002 | Long et al. | ................... | 717/148 |
| 2003/0149959 A1 * | 8/2003 | Lamping | ....................... | 717/116 |

(Continued)

OTHER PUBLICATIONS

Michael Haupt, "Virtual Machine Support for Aspect-Oriented Programming Languages," TU Darmstadt, 2006, <http://tuprints.ulb.tu-darmstadt.de/706/>, all pages.*

(Continued)

*Primary Examiner* — Ziaul A Chowdhury
(74) *Attorney, Agent, or Firm* — Lowenstein Sandler LLP

(57) ABSTRACT

Implementing aspects via callback in a virtual machine, where an aspect weaver weaves the aspect with a module to provide primary and crosscutting functionality in the runtime execution of the module. The virtual machine has multiple modules that are part of an application implementing separation of concerns. Each of the multiple modules has a distinct functionality portion and a common functionality portion, common to all modules. The common functionality is referenced by the virtual machine via callback for the multiple modules. Aspect code is loaded as a callback that is applied to the multiple modules by the virtual machine. Loading the aspect code as a callback can implement the aspect at any point in the modules, including conditional statements, calls to methods of objects or classes, loops, any point in an exception handler, or to monitor changes in variables.

17 Claims, 6 Drawing Sheets

(56) References Cited

U.S. PATENT DOCUMENTS

| | | | | |
|---|---|---|---|---|
| 2003/0196196 A1* | 10/2003 | Nylander | ................... | G06F 8/41 717/159 |
| 2004/0123290 A1* | 6/2004 | Overton | .............. | G06F 9/45504 718/1 |
| 2004/0148603 A1* | 7/2004 | Baylis | ................. | G06F 9/45504 718/100 |
| 2004/0205776 A1* | 10/2004 | Harrington | ............... | G06F 8/67 719/320 |
| 2004/0218208 A1* | 11/2004 | Akiyoshi | ................... | G06F 8/41 358/1.15 |
| 2004/0268370 A1* | 12/2004 | Mosier | ................ | G06F 9/45516 719/328 |
| 2006/0026570 A1* | 2/2006 | Chan | ....................... | G06F 8/316 717/127 |
| 2006/0031814 A1* | 2/2006 | Morin | ................... | G06F 9/4436 717/104 |
| 2006/0036426 A1* | 2/2006 | Barr et al. | ....................... | 703/22 |
| 2006/0069759 A1* | 3/2006 | Snyder | .................... | G06F 8/316 709/221 |
| 2006/0075112 A1* | 4/2006 | Polozoff | ............. | H04L 65/1066 709/227 |
| 2006/0212844 A1* | 9/2006 | Goldin | ................ | G06F 9/45533 717/106 |
| 2006/0288106 A1* | 12/2006 | Kumar | .................... | G06F 8/316 709/227 |
| 2007/0055965 A1* | 3/2007 | Colyer | .......................... | 717/143 |
| 2007/0088922 A1* | 4/2007 | Passerini et al. | ............. | 711/154 |
| 2007/0124723 A1* | 5/2007 | Chapman | ................ | G06F 8/316 717/106 |
| 2007/0234308 A1* | 10/2007 | Feigenbaum | ........... | G06F 8/316 717/130 |
| 2007/0234322 A1* | 10/2007 | Palacz et al. | .................. | 717/148 |
| 2007/0240105 A1* | 10/2007 | Herrmann | ................. | G06F 8/30 717/106 |
| 2008/0005719 A1* | 1/2008 | Morris | ...................... | G06F 8/41 717/100 |
| 2008/0046868 A1* | 2/2008 | Tsantilis | ........................ | 717/136 |
| 2008/0141335 A1* | 6/2008 | Thomas | ............................ | 726/1 |
| 2009/0007084 A1* | 1/2009 | Conallen | ................... | G06F 8/35 717/146 |
| 2009/0235282 A1* | 9/2009 | Meijer et al. | .................. | 719/320 |
| 2010/0005477 A1* | 1/2010 | Bovet et al. | ................... | 719/313 |
| 2010/0138815 A1* | 6/2010 | Schneider | ................. | G06F 8/41 717/141 |

OTHER PUBLICATIONS

Christoph Bockisch et al. "Adapting Virtual Machine Techniques for Seamless Aspect Support", [Online], ACM 2006, pp. 109-124, [Retrieved from Internet on Mar. 1, 2017], <http://delivery.acm.org/10.1145/1170000/1167483/p109-bockisch.pdf>.*

Wolfgang Schröder-Preikschat et al., "Static and Dynamic Weaving in System Software with $AspectC_{++}$", IEEE 2006, pp. 1-10, [Retrieved from INternet on Mar. 1, 2017], <http://ieeexplore.ieee.org/stamp/stamp.jsp?arnumber=1579729>.*

Yvonne Coady et al., "Using AspectC to Improve the Modularity of Path-Specific Customization in Operating System Code", [Online], 2001, pp. 88-98, [Retrieved from Internet on Oct. 12, 2017], <http://delivery.acm.org/10.1145/510000/503223/p88-coady.pdf>.*

Yvonne Coady et al., "Structuring Operating System Aspects", [Online], 2001, pp. 79-82, [Retrieved from Internet on Oct. 17, 2017], <https://plg.uwaterloo.ca/~migod/846/papers/aop-coady.pdf>.*

Iris Groher et al., "Generating Aspect Code from UML Models", [Online], 2003, pp. 1-5, [Retrieved from Internet on Oct. 12, 2017], <https://pdfs.semanticscholar.org/0719/cd52b58af13a239c1cb89bcfc90a26be3bf.pdf>.*

Andy Kellens et al., "A Survey of Automated Code-Level Aspect Mining Techniques", [Online], 2007, pp. 1-20, [Retrieved from Internet on Oct. 12, 2017], <ftp://ssel.vub.ac.be/tech_report/2006/vub-prog-tr-06-31.pdf>.*

* cited by examiner

IMPLEMENTING ASPECTS WITH CALLBACKS IN VIRTUAL MACHINES

FIELD

The invention is generally related to executing programmatic aspects, and more particularly to implementing aspects with callbacks in a virtual machine.

COPYRIGHT NOTICE/PERMISSION

At least a portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2008, Red Hat, Inc., All Rights Reserved.

BACKGROUND

A general tendency in the development of applications is to include more and more functionality. The increase of functionality typically also increases the complexity of the application development and maintenance. One way to counter the increase in complexity is to implement a "separation of concerns" in the programming development. A separation of concerns is understood to refer to development of programs in modular pieces, each focused on a primary functionality. The primary functionality provided by the module is the "primary concern" for the module. One challenge with separation of concerns is that all programming efforts involve "crosscutting concerns" that do not fit neatly within any one separate module, but rather apply to multiple different functional modules. The classic example of a crosscutting concern is a logging function. The logging function is generally a functionality that applies to most if not all of the modular pieces of the application. Thus, separating the logging functionality into its own separate module does not make sense in traditional separation of concerns programming.

To address the issue of crosscutting concerns, aspect oriented programming (AOP) was developed. AOP generally adds a special class to object-oriented programming environments that allow the creation of a so-called "aspect" that has the functionality of the crosscutting concern. The aspect belongs to a special class that has special properties to allow the aspect code or the crosscutting functionality to be "weaved" into the application during compilation of the application source code. Typically, a specialized loader loads and inserts the aspect code at well-defined points (e.g., the end of a method, the beginning of an exception handler) in the intermediate code of a virtual machine to allow the incorporation of the aspect functionality.

Consider as examples the application of aspects by AspectJ for Java code, and Aspect.pm for Perl, which apply the aspects by directly modifying the application code, or the code that will be evaluated by the virtual machine. Note that all trademarks used herein are used solely for purposes of identification of a product, and all trademarks are the property of their respective owners. AspectJ is available from the ECLIPSE FOUNDATION, which has locations in Ottawa, Ontario Canada and Portland, Oreg. AspectJ applies aspects by providing a custom Java class loader that inserts code to apply the aspects as classes, which are loaded into memory. The Aspect.pm Perl module applies aspects by replacing subroutine entries in the symbol table with wrappers that incorporate the aspect functionality. Such applications are relatively fast for runtime execution. There is a small load-time hit while the code modification, or weaving, takes place, but otherwise the application of aspects in these systems does not require much overhead. However, the application of aspects in traditional system is inflexible.

Aspects as applied externally by specialized loaders are limited to where the aspects can be applied. The application of aspects in traditional implementations change the code evaluated by the virtual machine, but do not directly change how the virtual machine will operate.

BRIEF DESCRIPTION OF THE DRAWINGS

The following description includes discussion of figures having illustrations given by way of example of implementations of embodiments of the invention. The drawings should be understood by way of example, and not by way of limitation.

DETAILED DESCRIPTION

Figure 1:
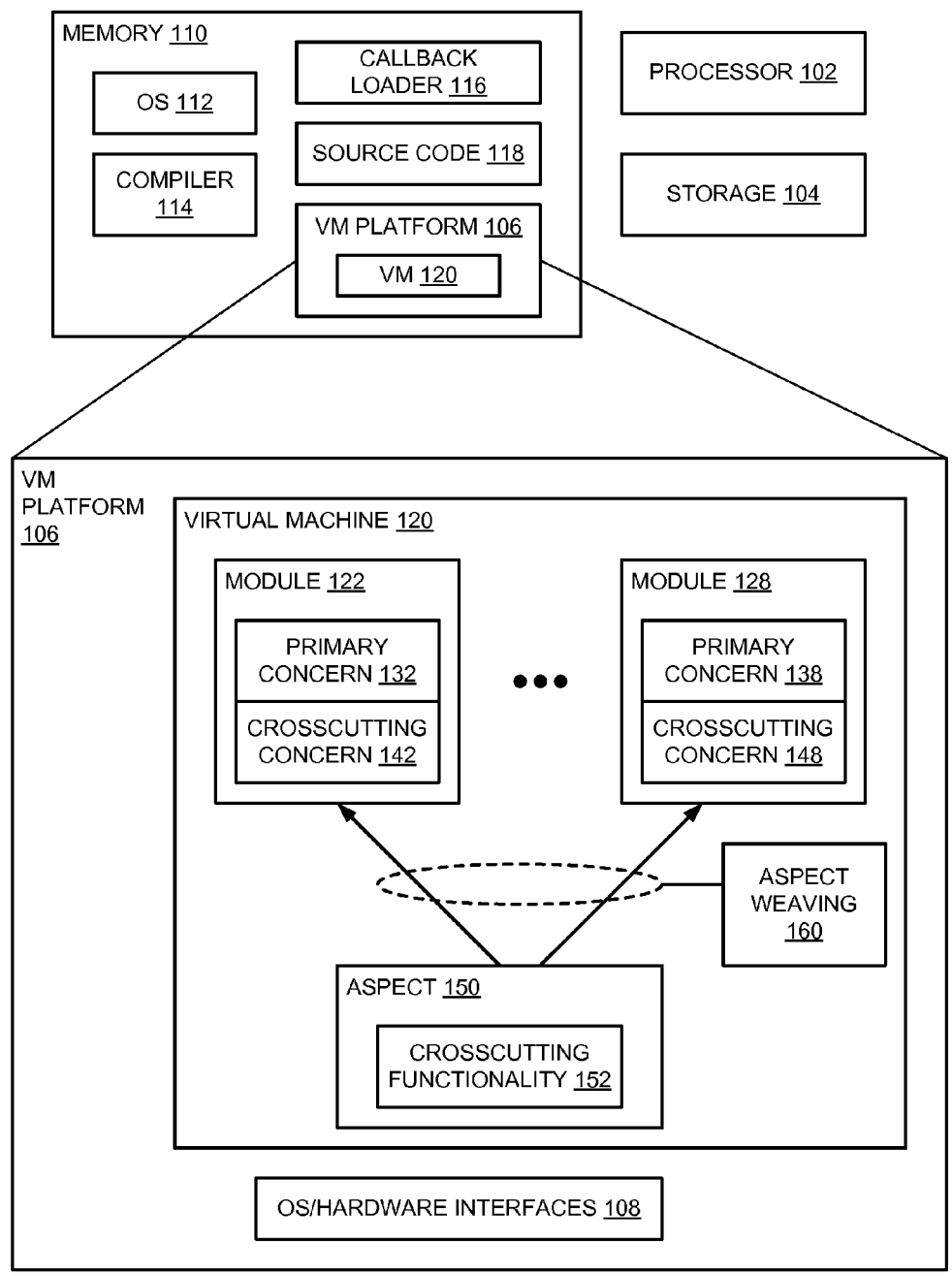
FIG. 1 is a block diagram of an embodiment of a system having a virtual machine that implements an aspect with a callback.

As described herein, aspects are implemented via callbacks in a virtual machine (or "VM"). The VM operates both in its traditional role of evaluating intermediate code, by which modules of a program provide their primary functionality, and in the role of an aspect weaver, executing aspects as callbacks, by which the aspects provide crosscutting functionality of a program to the modules. In this way, the aspects can be applied at any well defined point during the execution of a module of a program, including conditional statements, calls to methods or functions, loops, at any point in a chain of exception handlers, or to monitor access to or changes of a stored variable.

In contrast to known aspect weaving, which modifies the code that gets evaluated by a virtual machine, the implementation of aspects via callbacks does not modify the code to be evaluated, but changes how the virtual machine will operate. The implementation of aspects via callbacks provides considerable flexibility in a system. Instead of weaving with a class loader as with traditional aspect implementation, the weaving operation with callbacks can happen dynamically within the virtual machine via the callback mechanism, without the need to change the intermediate code. Via the callbacks within the virtual machine, the aspect weaving may be considered just calling the callback code, which automatically weaves the code into the target module by virtue of the operation of a callback.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required operations of the method. Structure for a variety of these systems will appear as set forth in the description below. In addition, the present invention is not described with reference to any particular programming language. It will be appreciated that a variety of programming languages may be used to implement the teachings of the invention as described herein.

Referring to the implementation of aspects with callbacks in a virtual machine, it will be understood that many programming languages allow development of programs or applications that will be implemented in a virtual machine, or implemented from an intermediate state. Development of applications to execute on a virtual machine allows "platform-independent" development. Source code can be developed once that will be executable on systems independent of the platform of the system. The source code (human-readable code) is converted or compiled into an intermediate state or intermediate form, referred to herein as "intermediate code." A basic principle of a virtual machine environment is that the virtual machine evaluates and executes the intermediate code, rather than machine code specific to a particular platform. Thus, a virtual machine layer essentially translates the intermediate code into instructions executable on a hardware and operating system environment of the computing device on which the virtual machine executes. JAVA (of SUN MICROSYSTEMS of Sunnyvale, Calif.) is a well-known example of a virtual machine (VM) environment. PERL (of the PERL FOUNDATION) is an example of a programming language that uses an intermediate state of code. As used herein, virtual machine or VM refers generically to any platform that utilizes the concept of intermediate code.

As is mentioned above, "aspects" refer to mechanisms used in systems that employ a separation of concerns in the development of an application. In separation of concerns, each modular component has a distinct, primary concern. Multiple modules may need to share functionality that deals with a crosscutting concern, which is functionality needed commonly among the modular components. An aspect is a special construct that allows the development of the functionality to implement the crosscutting concern, and then have the functionality weaved into the application to be implemented in conjunction with the modules that need the functionality.

It will be further be appreciated that callbacks are programming mechanisms used to, for example, pass a function as an argument to another function. Callbacks generally allow the passing of executable code to another piece of code. Typically, callbacks are implemented by passing references to code, rather than passing the code directly. Passing reference to the code can take the form of passing a direct pointer to the executable code (for example, C and C++ pass function pointers that are the virtual addresses of the code to be executed, which carries a risk of passing a bogus or corrupted address), an opaque reference token (for example, a code reference in Perl is a specially typed value that can only be created by explicitly asking for a reference to a given piece of code), or an object that implements a particular callback reference (which is how callbacks are handled in Java). Callbacks are often loaded separately from a particular software environment in which they will be called, and may be "external" to the code into which they are called. Implementation of a callback in a VM may allow modification of the operation of the VM without having to change the code loaded in the VM.

An aspect can be loaded and registered as a callback, and thus be called within a VM by another function. In this manner, the weaving of the aspect may happen automatically, without the need for a specialized loader. Rather, the "aspect loader" may simply be the loading mechanism within the VM that loads the intermediate code for evaluation by the VM. The VM loader would load the aspect code for calling as a callback. Thus, in one embodiment, no separate mechanism need be in place to weave the aspect code.

In one embodiment, the callback causes the virtual machine to evaluate or execute certain intermediate instructions, or certain operations of the program, which represent the functionality of the aspect. The intermediate instructions can be identified in the aspect callback by reference to functions, calls, methods, or address space. Thus, some amount of intermediate instructions can be evaluated by operation of the callback. It will be understood that the program operations would be operations that may not normally be called to perform a certain function. Thus, a certain function can be executed, for example, which points to a particular entry in the reference table, which references the callback. The callback can then cause other parts of the program to be executed by causing the virtual machine to evaluate certain intermediate instructions.

FIG. 1 is a block diagram of an embodiment of a system having a virtual machine that implements an aspect via callback. System 100 may be any type of computing device or computing system or platform on which a virtual machine may be implemented. For example, system 100 may be a banking system, or an embedded computing device. System 100 includes processor 102 to execute machine code or machine-level instructions. System 100 includes storage 104, which represents non-volatile storage (e.g., it does not lose its state, even in the event of an interruption of power) to store applications and application components (e.g., human-readable code) for loading and execution on VM 120.

System 100 includes memory 110, or a storage device which can be, for example, main memory in a computer system. Memory 110 is frequently, though not necessarily, volatile. Memory 110 stores instructions that are executed by processor 102. Memory 110 includes OS (operating system) 112, which represents a software platform on which programs in system 100 execute. Programs in system 100 will generally be stored in and executed from memory 110. Memory 110 also includes compiler 114, which represents a program that generates intermediate code from source code 118. Source code 118 represents any type of source code that may be loaded onto system 100, or generated or developed on system 100. Specifically for purposes of discussion here, source code 118 may be understood as code developed for a programming language that utilizes intermediate code. Compiler 114 processes the human-readable instructions of source code 118 into intermediate, virtual-machine readable instructions.

Callback loader 116 in memory 110 represents a module or a program that enables the loading of a callback into a virtual machine. In one embodiment, callback loader 116 is part of VM 120, and/or runs on VM platform 106. Specifically for purposes of discussion here, it will be understood that callback loader 116 may load and reference aspect code as a callback. Briefly, callback loader 116 loads the callback into memory, and references the callback from any point within the intermediate code. As such, the virtual machine can identify aspects at points other than the well-defined points as implemented in prior art systems that utilize specialized loaders to weave the aspect code. In one embodiment, callback loader 116 can be said to register callbacks. Registering the callbacks includes identifying the callbacks for use in the system. A registered callback is thus known to the system, and may include knowing the callback's reference or identifier, and knowing how to call and/or interface with the callback. Calling the callback can include providing parameters for the functionality of the callback.

Thus, the callback can be used for different or additional functionality than that provided by a module within VM 120. The different functionality may be different functions as defined in the callback and/or the calling of portions of the intermediate code. The additional functionality may be to provide code for method calls in the modules. In one embodiment, callback loader 116 is called in response to an operation of the virtual machine. Thus, the virtual machine may have logic or a function module that can call callback loader 116 to initiate the modification of a certain function or loading of an aspect.

Memory 110 includes VM platform 106, which represents an engine or runtime environment on which virtual machines (VMs) execute. VM platform 106 enables execution of the intermediate code as referred to above, and evaluates the code and implements executable machine code that the underlying hardware/software platform of system 100 can execute. VM platform 106 includes OS/hardware interfaces 108, which is an abstraction to generically represent mechanisms within the virtual machine environment to cause operations to be executed in OS 112, hardware of system 100 (such as processor 102), or another program executing on system 100 (not shown).

VM platform 106 is illustrated with VM 120, having two or more modules, 122-128, loaded in the VM. Modules 122-128 exist within VM 120 as bytecode or some other intermediate code form, which is executable by VM 120. Each module 122-128 includes a primary concern 132-138, and a crosscutting concern 142-148, respectively. While the primary concerns are assumed to be different for each module for purposes of this simplified example, the crosscutting concerns are all the same, and are addressed by crosscutting functionality 152. It will be understood that each module may have multiple crosscutting concerns, which may not be the same for each module. Not all modules within VM 120 will necessarily have the same crosscutting concerns. Thus, multiple aspects may be applicable to VM 120 to provide all crosscutting functionality needed within the system.

VM 120 includes aspect 150, which includes crosscutting functionality 152. As mentioned above, crosscutting functionality 152 handles crosscutting concerns 142-148. Aspect 150 is implemented via aspect weaving 160, through which VM 120 implements aspect 150 as a callback for the various modules. Thus, aspect 150 may be implemented as a callback that is loaded and implemented on the same VM as the program it modifies.

Figure 2:
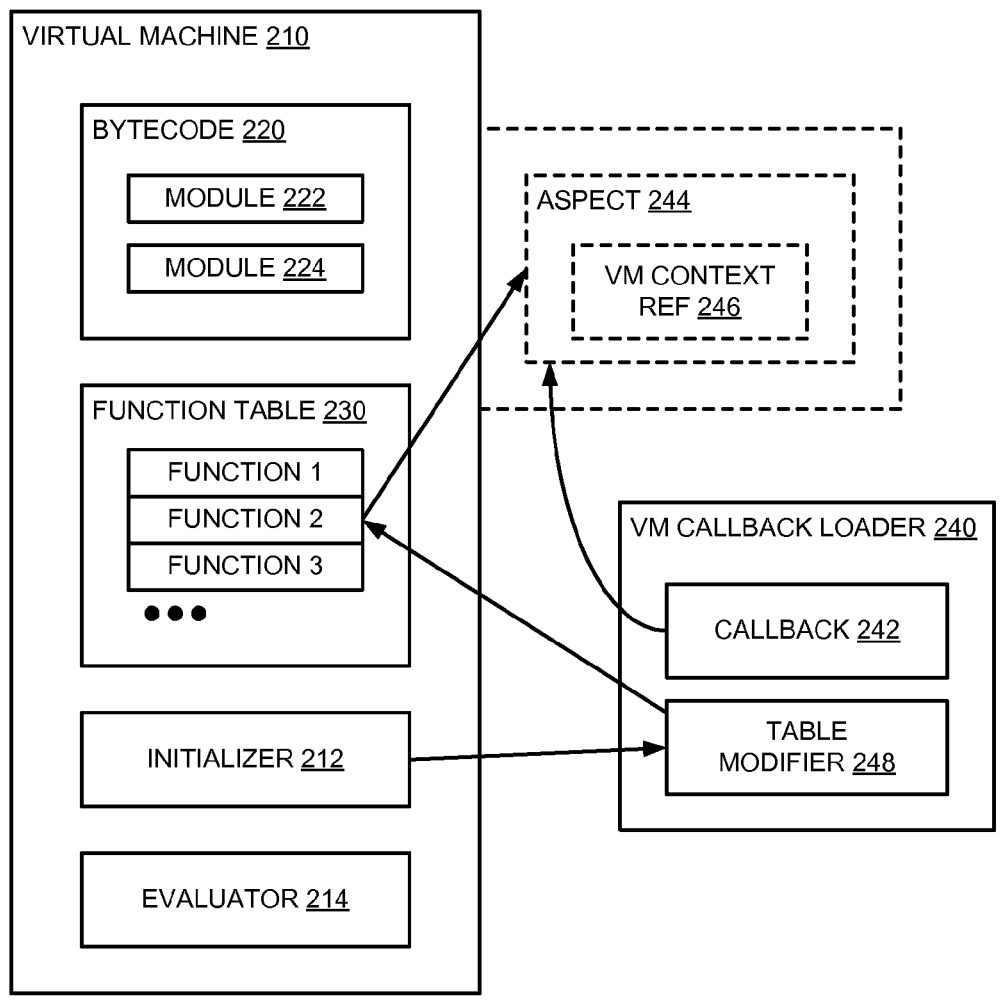
FIG. 2 is a block diagram of an embodiment of a system having a virtual machine that loads and implements an aspect as a callback.

FIG. 2 is a block diagram of an embodiment of a system having a virtual machine that loads and implements an aspect as a callback. System 200 may be any type of computing device or computing system or platform on which a virtual machine may be implemented, in accordance with any embodiment described herein. System 200 includes virtual machine 210, which executes a program represented by bytecode 220. Bytecode 220 represents intermediate instructions to be evaluated by virtual machine 210 (on a virtual machine platform, not shown), and executed in system 200. Bytecode 220 includes multiple functional components or modular components, including modules 222 and 224.

Virtual machine 210 also includes function table 230, which includes various functions (e.g., Functions 1-3) that may be called within bytecode 220. Each function listed in function table 230 references a definition or intermediate code to execute the function within virtual machine 210. Consider that module 222 has a crosscutting concern or crosscutting function. In one embodiment, the crosscutting function is provided by Function 2, listed in function table 230. Function 2 can reference aspect 242 loaded as a callback to provide the functionality.

In one embodiment, function table 230 can be modified in response to an operation of VM 210, or from an external callback loader, to reference callback code loaded with a program, or external callback code loaded into the VM. Thus, VM 210 can perform an operation that causes VM callback loader 240 to load a particular callback (e.g., 242). In one embodiment, the operation of VM 210 causes an exception, and modifying the reference table is part of handling the exception. Enabling the callback in response to an exception can allow the VM to perform operations that would otherwise be outside the operation of the VM.

The callback mechanism as described within the VM allows the modification of a function, which could provide an alternate definition for a selected function, or alternate functionality, such as aspect functionality. The callback mechanism can thus enable modifications to legacy programs, even when the source code is unavailable, as well as the implementation of aspect as described.

Initializer 212 initializes VM 210, which may include setting configuration values, initializing platform interfaces, etc. As part of the initialization, initializer 212 may make a function call to VM callback loader 240. VM callback loader 240 may be a standard function available within the programming language environment (such as an external call function built into Perl), or may be a module to enable loading callbacks into the VM environment.

VM callback loader 240 includes callback 242 and table modifier 248. Callback 242 includes the code to implement the aspect functionality within VM 210. The aspect functionality is represented as aspect 244, and can include function definitions in the callback, as well as, or alternatively, intermediate instructions in the VM. VM callback loader 240 stores or loads callback 242 as aspect 244 into memory. The aspect typically operates within the same context as the module that calls it, which provides access to the aspect to variables used by the module.

Table modifier 248 represents code that modifies function table 230. Specifically, for example, function 2 can reference or point to aspect 244 where it is loaded into the VM platform. In one embodiment, VM callback loader 240 passes (for example, by table modifier 248) VM context reference (ref) 246 in aspect 244. Initializer 212 may pass a VM context of VM 210 to table modifier 248, which can then be used to access and modify function table 230. Table modifier 240 can also store the reference to the context in aspect 244.

VM 210 includes evaluator 214, which evaluates bytecode 220 at runtime to execute a program. Evaluator 214 will use aspect 244 where referenced in the intermediate instructions of the modules within bytecode 220. The use of the aspect effectively changes the functionality of the program in VM 210 at runtime.

Figure 3:
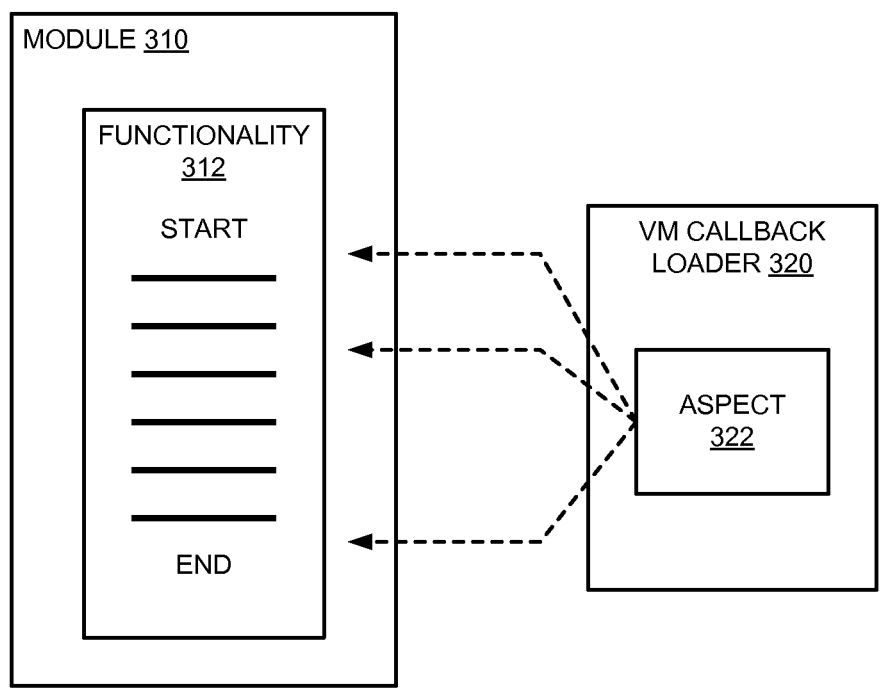
FIG. 3 is a block diagram of an embodiment of a system that enables weaving of aspect code into any random point within a code module implementing the aspect code.

FIG. 3 is a block diagram of an embodiment of a system that enables weaving of aspect code into any random point within a code module implementing the aspect code. System 300 represents an embodiment of a system having a VM that implements aspects with callbacks in accordance with any embodiment described herein. System 300 includes module 310, which is a module of an application or program that is run on a VM (not explicitly shown) of system 300. Module 310 includes functionality 312, which represents the functionality of module 310. The functionality of module 310 refers to the operations that module 310 causes to be performed within the VM. The functionality will be understood to be dependent both on the application as well as potentially the environment in which the application is executed.

As illustrated, in one embodiment, functionality 312 includes a start and an end. Between the start and end is depicted a main body of code, which includes a sequence or sequences of operations, function calls, functions, methods, etc. The actual code is not significant for the description of FIG. 3. Rather, functionality 312 can illustrate that aspect 322 can be weaved into any arbitrary point of module 310. Contrast such an approach with known specialized loaders that are limited to applying aspects at well-defined points that are identifiable from the application code by the loader. For example, traditional aspect loaders commonly weave in the aspect code at the end of a method. As another example, known aspect loaders, such as the one for AspectJ, can only join an aspect on the beginning of an exception handler, because the loader cannot easily find the end of the exception handler by only examining the bytecode. However, implementing aspects with callbacks allows the aspect to be joined at any arbitrary point, adding, for example, loops, conditionals, the end (or even the middle) of exception handlers, etc. Thus, VM bytecode can reference a callback, which is loaded, added to the VM, and registered. The aspect functionality can then be inserted dynamically at runtime into the VM, anywhere within the code. The aspects can be weaved into the execution functionality at any one or more of the following points: at a conditional statement in one of the multiple modules, at a call to a method of an object in one of the multiple modules, or at a loop in one of the multiple modules. Besides being very flexible, such an approach implements aspects on an as-needed basis, rather than implementing all aspects in every loading of a program.

System 300 is illustrated with VM callback loader 320, which loads and weaves aspect 322 into module 310. VM callback loader 320 can load any callbacks within system 300, including those that provide aspect functionality, such as aspect 322.

Figure 4:
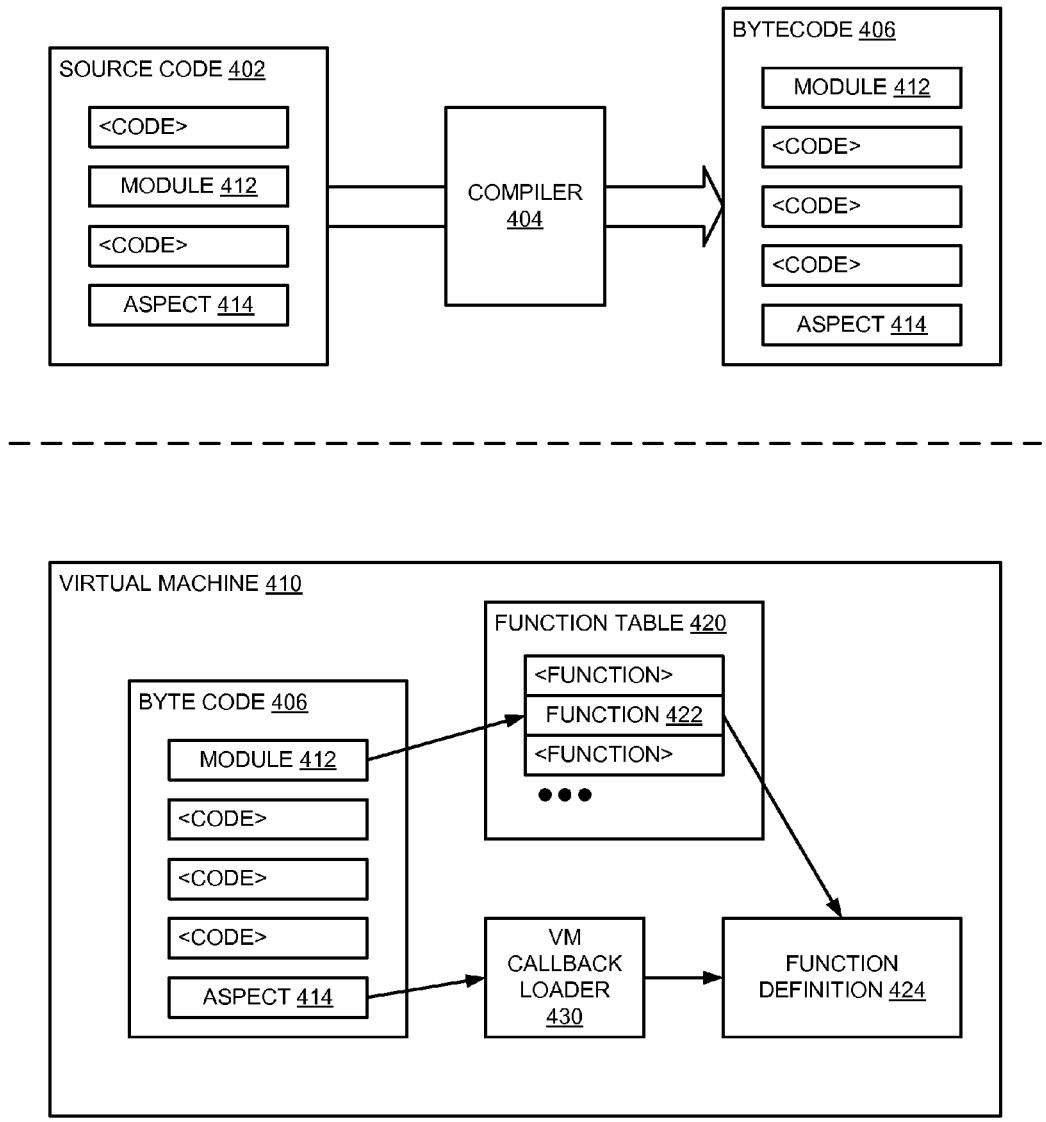
FIG. 4 is a block diagram of an embodiment of a representation of generating intermediate code, and a virtual machine that implements an aspect via callback.

FIG. 4 is a block diagram of an embodiment of a representation of generating intermediate code, and a virtual machine that implements an aspect via callback. Source code 402 is converted into intermediate form, bytecode 406, by compiler 404. The conversion or compilation is similar or the same as known in the art. VM 410 evaluates and causes bytecode 406 to execute. Source code 402 includes module 412 and aspect 414. In one embodiment, aspect code is generated and included with source code for a program. In one embodiment, the aspect code is provided externally to the application code. Bytecode 406 includes code to implement module 412, and aspect 414. Again, code to implement aspect 414 could be added after, or could be included with the application code.

VM 410 could make aspect code available to module 412 via function table 420, which can load functionality referenced by the module. As an example, consider function table 420, which has function 422 corresponding to functionality for module 412. Function definition 424 can be weaved with the functionality of aspect 414, by VM callback loader 430, as a callback. Note that reference to callbacks in general, including aspect 414, should persist as long as VM 410 is operational. Thus, the aspect implemented as a callback should be effective to provide the aspect/crosscutting functionality for the entire time the program executes.

Figure 5:
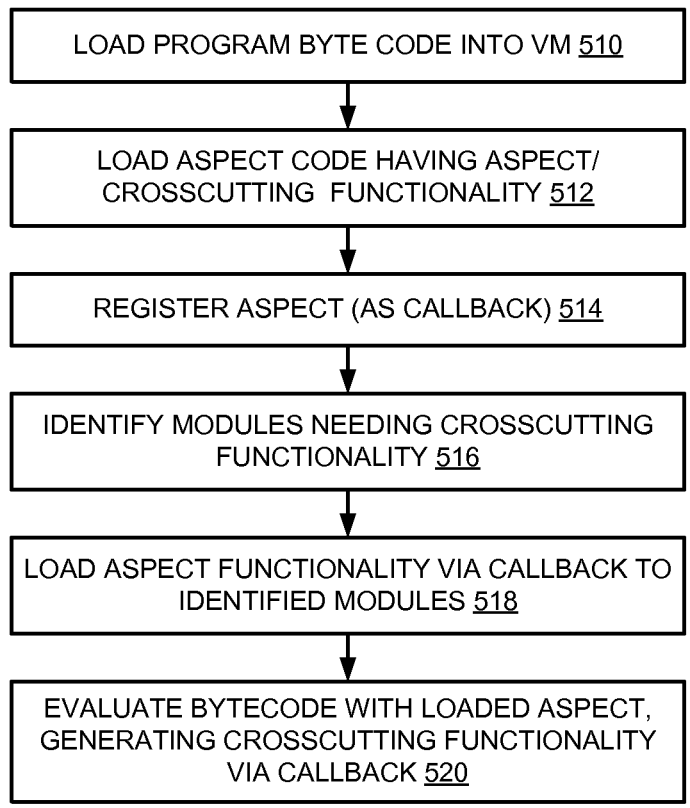
FIG. 5 is a flow diagram of an embodiment of a method for implementing an aspect via callback in a virtual machine.

FIG. 5 is a flow diagram of an embodiment of a method for implementing an aspect via callback in a virtual machine. The method or process may be performed by processing logic that may include hardware (e.g., circuitry, programmable logic, microcode, etc.), software (such as instructions run on a processing device), or a combination thereof. For convenience, reference is made to components described below that might perform one or more of the operations described below. Reference to particular components may not necessarily be exclusive, and other components not specifically called out may perform one or more of the following operations.

In one embodiment, a program loader on the computer device loads the program bytecode into a VM in a VM platform, 510. Initialization of the VM may include the loading of an aspect (e.g., 244) as callback code (e.g., 242), where the aspect code has crosscutting functionality (e.g., 152), 512. In one embodiment, the aspect is registered as a callback, 514. The callback will be registered with the VM or VMs into which the crosscutting functionality will be weaved via callback. The loading of the program may call a function or method that will dynamically register the callback. Registering the aspect/callback generically refers to configuring the VM to recognize the aspect.

The VM identifies modules needing crosscutting functionality, 516. The identification may occur during development of the program, and the modules will include reference to a callback to implement the aspect. Thus, the identification can occur during runtime in the VM, which may receive a request for the callback during execution, and load the aspect functionality via callback for the identified modules, 518. In one embodiment, the calling of the callback can be said to add the aspect functionality to the VM via callback. The VM evaluates the bytecode with the modified functionality (i.e., the added functionality of the callback aspect), generating the crosscutting functionality via callback, 520.

Figure 6:
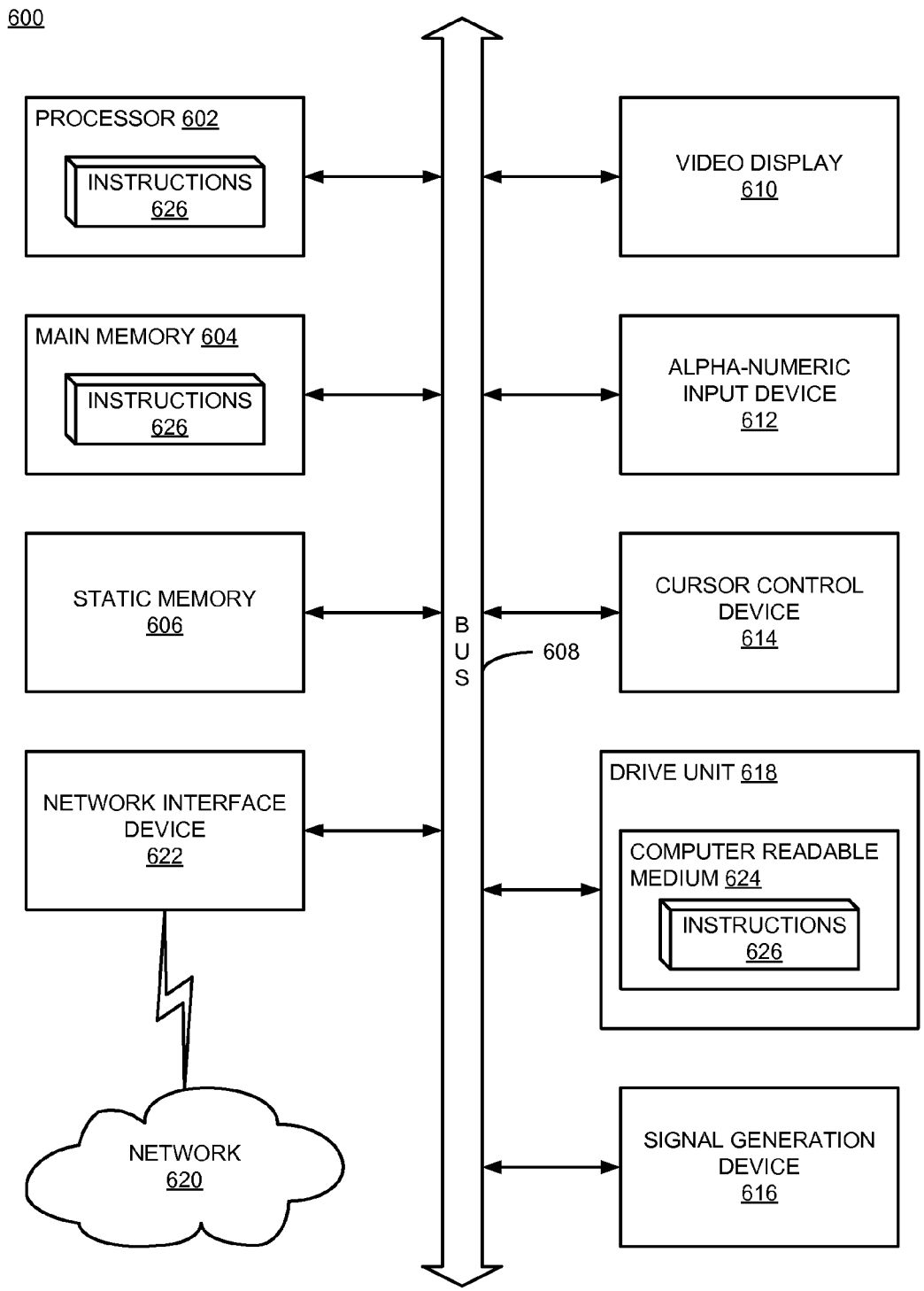
FIG. 6 is a block diagram of a computing device on which embodiments of the invention may be implemented.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 622 for performing the operations and steps discussed herein.

The computer system 600 may further include a network interface device 626. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 624 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 626.

While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine readable storage medium" shall accordingly be taken to include, but not be limited to, solid-state memories, and optical and magnetic media.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
loading, by a processor, a first executable code module into a virtual machine, wherein the first executable code module comprises a conditional statement;
loading a second executable code module into the virtual machine, wherein the second executable code module comprises an aspect code;
identifying, by a reference to a virtual machine context associated with the virtual machine, a function table associated with the virtual machine;
modifying the function table associated with the virtual machine to reference the aspect code;
storing, in the aspect code, the reference to the virtual machine context; and
causing the virtual machine to execute, at the conditional statement within the first executable code module, the aspect code referenced by the function table, by applying the aspect code at an execution point of the conditional statement, wherein causing the virtual machine to execute the aspect code comprises tracking a variable change within the first executable code module, and wherein applying the aspect code provides cross-cutting functionality to the first executable code module executing an aspect weaving operation with callback within the virtual machine via a callback mechanism without changing intermediate code.

2. The method of claim 1, wherein the first executable code module comprises one of bytecode or code in a syntax tree format.

3. The method of claim 1, wherein causing the virtual machine to execute the aspect code comprises:
compiling the aspect code into executable code.

4. The method of claim 1, wherein causing the virtual machine to execute the aspect code comprises providing a parameter of the aspect code.

5. The method of claim 1, wherein causing the virtual machine to execute the aspect code is performed in response to an exception generated during execution of the code module.

6. The method of claim 1, wherein modifying the function table comprises identifying the function table using a virtual machine context associated with the virtual machine.

7. A non-transitory computer-readable storage medium having instructions stored thereon to cause a processor to:
load, by the processor, a first executable code module into a virtual machine, wherein the first executable code module comprises a conditional statement;
load a second executable code module into the virtual machine, wherein the second executable code module comprises an aspect code;
identify, by a reference to a virtual machine context associated with the virtual machine, a function table associated with the virtual machine;
modify the function table associated with the virtual machine to reference the aspect code;
store, in the aspect code, the reference to the virtual machine context; and
cause, by the processor, the virtual machine to execute, at a point of the conditional statement within the first executable code module, the aspect code referenced by the function table, by applying the aspect code at an execution point of the conditional statement, wherein causing the virtual machine to execute the aspect code comprises tracking a variable change within the first executable code module, and wherein applying the aspect code provides cross-cutting functionality to the first executable code module executing an aspect weaving operation with callback within the virtual machine via a callback mechanism without changing intermediate code.

8. The non-transitory computer-readable storage medium of claim 7, wherein the first executable code module comprises one of bytecode or code in a syntax tree format.

9. The non-transitory computer-readable storage medium of claim 7, wherein executable instructions to cause the virtual machine to execute the aspect code further comprise executable instructions to cause the processor to:
provide a parameter of the aspect code.

10. The non-transitory computer-readable storage medium of claim 7, wherein executable instructions to cause the virtual machine to execute the aspect code further comprise executable instructions to cause the processor to:
generate an exception during execution of the code module.

11. A system comprising:
a data storage device to store a first code module comprising a conditional statement; and
a central processing unit (CPU), operatively coupled to the data storage device, to:
load a second code module into the virtual machine, wherein the second code module comprises an aspect code;
identify, by a reference to a virtual machine context associated with the virtual machine, a function table associated with the virtual machine;
modify the function table associated with the virtual machine to reference the aspect code;
store, in the aspect code, the reference to the virtual machine context; and
cause the virtual machine to execute, at a conditional statement within the first code module, the aspect code referenced by the function table, by applying the aspect code at an execution point of the conditional statement, wherein causing the virtual machine to execute the aspect code comprises tracking a variable change within the first executable code module, and wherein applying the aspect code provides cross-cutting functionality to the first executable code module executing an aspect weaving operation with callback within the virtual machine via a callback mechanism without changing intermediate code.

12. The non-transitory computer-readable storage medium of claim 7, further comprising executable instructions causing the processor is to:
compile the aspect code into executable code.

13. The system of claim 11, wherein the first executable code module comprises one of bytecode or code in a syntax tree format.

14. The system of claim 11, wherein to cause the virtual machine to execute the aspect code, the CPU is to:

compile the aspect code into executable code.

15. The system of claim 11, wherein to cause the virtual machine to execute the aspect code, the CPU is to:
provide a parameter of the aspect code.

16. The system of claim 11, wherein to cause the virtual machine to execute the aspect code, the CPU is to:
generate an exception during execution of the code module.

17. The system of claim 11, wherein to modify the function table, the CPU is to:
identify the function table using a virtual machine context associated with the virtual machine.

* * * * *